(12) United States Patent
Aldana et al.

(10) Patent No.: US 12,120,746 B2
(45) Date of Patent: Oct. 15, 2024

(54) CHANNEL SENSING FOR PHYSICAL RANDOM ACCESS CHANNEL (PRACH) SIGNALS IN NEW RADIO (NR) SYSTEMS OPERATING IN THE UNLICENSED SPECTRUM

(71) Applicant: Apple Inc., Cupertino, CA (US)

(72) Inventors: Carlos H. Aldana, Cupertino, CA (US); Salvatore Talarico, Cupertino, CA (US); Yongjun Kwak, Cupertino, CA (US); Lopamudra Kundu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 254 days.

(21) Appl. No.: 17/441,122

(22) PCT Filed: Jun. 19, 2020

(86) PCT No.: PCT/US2020/038728
§ 371 (c)(1),
(2) Date: Sep. 20, 2021

(87) PCT Pub. No.: WO2020/257645
PCT Pub. Date: Dec. 24, 2020

(65) Prior Publication Data
US 2022/0167423 A1 May 26, 2022

Related U.S. Application Data

(60) Provisional application No. 62/863,691, filed on Jun. 19, 2019.

(51) Int. Cl.
*H04W 74/0833* (2024.01)
*H04W 72/23* (2023.01)
*H04W 74/00* (2009.01)

(52) U.S. Cl.
CPC ....... *H04W 74/0833* (2013.01); *H04W 72/23* (2023.01); *H04W 74/004* (2013.01)

(58) Field of Classification Search
CPC ............ H04W 74/0833; H04W 72/23; H04W 74/004; H04W 74/0841; H04W 74/008
See application file for complete search history.

(56) References Cited

U.S. PATENT DOCUMENTS

2020/0053798 A1* 2/2020 Tsai ................... H04W 72/23
2020/0275430 A1* 8/2020 Salem ................. H04L 5/001
(Continued)

OTHER PUBLICATIONS

Nokia et al. "Feature Lead's Summary on Channel Access Procedures", 3GPP Draft; R1-1813994; Nov. 16, 2018 (Year: 2018).*
(Continued)

*Primary Examiner* — Chae S Lee
(74) *Attorney, Agent, or Firm* — Eschweiler & Potashnik, LLC

(57) ABSTRACT

A user equipment (UE), or other network component can operate to configure channel occupancy time (COT) sharing in random access procedures involving the unlicensed spectrum. At least some of the messages for the procedures can share a COT by configuring one or more gaps or listen-before-talk (LBT) procedures based on the gap or whether the COT sharing is UE or gNB initiated. Some configurations can depend on a location in the random access procedure that COT sharing is acquired.

15 Claims, 18 Drawing Sheets

(56) References Cited

U.S. PATENT DOCUMENTS

2021/0112590 A1\* 4/2021 Kim .................... H04W 74/008
2021/0400705 A1\* 12/2021 Wu ....................... H04L 1/1896
2022/0256595 A1\* 8/2022 Wang ................ H04W 74/0866

OTHER PUBLICATIONS

3rd Generation Partnership Project; Technical Specification Group Radio Access Network; NR; Physical layer procedures for data (Release 15); 3GPP TS 38.214 V15.5.0 (Mar. 2019); http://www.3gpp.org.

International Preliminary Report on Patentability dated Dec. 30, 2021 in connection with PCT Application No. PCT/US2020/038728.

International Search Report Dated Sep. 4, 2020 for International Application PCT/US2020/038728.

Nokia, et al.; "Feature Lead's Summary on Channel Access Procedures", 3GPP Draft; R1-1813994; Nov. 16, 2018; URL: http://www.3gpp.org/ftp/tsg%5Fran/WG1%5FRL1/TSGR1%5F95/Docs/R1%2D1813994%2Ezip.

Ericsson; "E-UTRAN Random Access Procedure C-RNTI Assignment and HARQ on Message 4 with RACH Model"; 3GPP Draft; R2-070365; Jan. 22, 2007.

International Written Opinion Dated Sep. 4, 2020 for International Application PCT/US2020/038728.

3rd Generation Partnership Project; Technical Specification Group Radio Access Network; NR; Multiplexing and channel coding; (Release 15); 3GPP TS 38.212 V15.5.0; Mar. 2019.

3rd Generation Partnership Project; Technical Specification Group Radio Access Network; NR; Physical layer procedures for control; (Release 15); 3GPP TS 38.213 V15.5.0; Mar. 2019.

3rd Generation Partnership Project; Technical Specification Group Radio Access Network; NR; Radio Resource Control (RRC) protocol specification; (Release 15); 3GPP TS 38.331 V15.5.1; Apr. 2019.

EP Office Action dated Jan. 22, 2024 in connection with Application Serial No. 20 739 529.4.

\* cited by examiner

Table 500 PDSCH decoding time $N_1$ [symbols]

| $\mu$ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if higher layer parameter is not configured |
|---|---|---|
| | | $N_1$ |
| 0 | 8 | 13 |
| 1 | 10 | 13 |
| 2 | 17 | 20 |
| 3 | 20 | 24 |

*FIG. 5*

Table 600 PUSCH preparation time for PUSCH timing capability 1

| $\mu$ | PUSCH preparation time $N_2$ [symbols] |
|---|---|
| 0 | 10 |
| 1 | 12 |
| 2 | 23 |
| 3 | 36 |

*FIG. 6*

| Class # | $p_0$ | $CW_{min}$ | $CW_{max}$ | Maximum Channel Occupancy Time (COT) |
|---|---|---|---|---|
| 4 | 1 | 3 | 7 | 2 ms |
| 3 | 1 | 7 | 15 | 4 ms |
| 2 | 3 | 15 | 63 | 6 ms (see note 1 and note 2) |
| 1 | 7 | 15 | 1023 | 6 ms (see note 1) |

Note 1: The maximum *Channel Occupancy Time* (COT) of 6 ms may be increased to 8 ms by inserting one or more pauses. The minimum duration of a pause shall be 100 μs. The maximum duration (Channel Occupancy) before including any such pause shall be 6 ms. Pause duration is not included in the channel occupancy time.

Note 2: The maximum *Channel Occupancy Time* (COT) of 6 ms may be increased to 10 ms by extending CW to CW x 2 + 1 when selecting the random number q for any backoff(s) that precede the Channel Occupancy that may exceed 6 ms or which follow the Channel Occupancy that exceeded 6 ms. The choice between preceding or following a Channel Occupancy shall remain unchanged during the operation time of the device.

Note 3: The values for $p_0$, $CW_{min}$, $CW_{max}$ are minimum values. Greater values are allowed.

*FIG. 8*

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |
| COT sharing | 1 |
| CAT1 LBT or CAT2 LBT | 1 |

FIG. 9

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |
| CAT1, CAT2, or CAT 4 LBT | 2 |

*FIG. 10*

Table 6.2.1-1 Values of LCID for DL-SCH

| Index | LCID values |
|---|---|
| 0 | CCCH |
| 1-32 | Identity of the logical channel |
| 33-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

*FIG. 12*

CHANNEL SENSING FOR PHYSICAL RANDOM ACCESS CHANNEL (PRACH) SIGNALS IN NEW RADIO (NR) SYSTEMS OPERATING IN THE UNLICENSED SPECTRUM

REFERENCE TO RELATED APPLICATIONS

This application is a National Phase entry application of International Patent Application No. PCT/US2020/038728 filed Jun. 19, 2020, which claims the benefit of U.S. Provisional Application No. 62/863,691 filed Jun. 19, 2019, entitled "CHANNEL SENSING FOR PHYSICAL RANDOM ACCESS CHANNEL (PRACH) SIGNALS IN NEW RADIO (NR) SYSTEMS OPERATING IN THE UNLICENSED SPECTRUM", the contents of which are herein incorporated by reference in their entirety.

FIELD

The present disclosure relates to wireless technology, and moreover, to channel sensing for physical random access channel (PRACH) signals in new radio (NR) in the unlicensed spectrum.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

Recently, the first release on NR (5G) specification provided a baseline set of features and components for future cellular communication systems. Each year, the number of mobile devices connected to wireless networks significantly increases. In order to keep up with the demand in mobile data traffic, changes have to be made to system requirements to be able to meet these demands. Three critical areas that need to be enhanced in order to deliver this increase in traffic are larger bandwidth, lower latency, and higher data rates.

One of the major limiting factors in wireless innovation is the availability in spectrum. To mitigate this, the unlicensed spectrum has been an area of interest to expand the availability of long-term evolution (LTE). In this context, one major enhancement for LTE in third generation partnership project (3GPP) Release 13 has been to enable its operation in the unlicensed spectrum via licensed-assisted access (LAA), which expands the system bandwidth by utilizing a flexible carrier aggregation (CA) framework introduced by the LTE-Advanced system. Now that the main building blocks for the framework of new radio (NR) have been established, a natural enhancement is to allow this framework to operate on an unlicensed spectrum as NR-U, especially regarding channel occupancy time (COT) sharing to deliver an increase in traffic with one of larger bandwidth, lower latency, or higher data rates.

BRIEF DESCRIPTION OF THE DRAWINGS

FIG. 5 is an example table for physical downlink shared channel (PDSCH) processing times for capability 1 in according to various aspects.

FIG. 6 is an example table for physical uplink shared channel (PUSCH) preparation times for capability 1 in according to various aspects.

FIG. 8 is an example table for priority class information for COT sharing according to various aspects.

FIG. 9 is an example of fields in a table for random access response (RAR) grant messaging for COT sharing according to various aspects.

FIG. 10 is another example table of fields in a table for random access response (RAR) grant messaging for COT sharing according to various aspects.

FIG. 12 is an example of values of logical channel ID for a physical shared channel for random access response (RAR) grant messaging in COT sharing according to various aspects.

DETAILED DESCRIPTION

Figure 1:
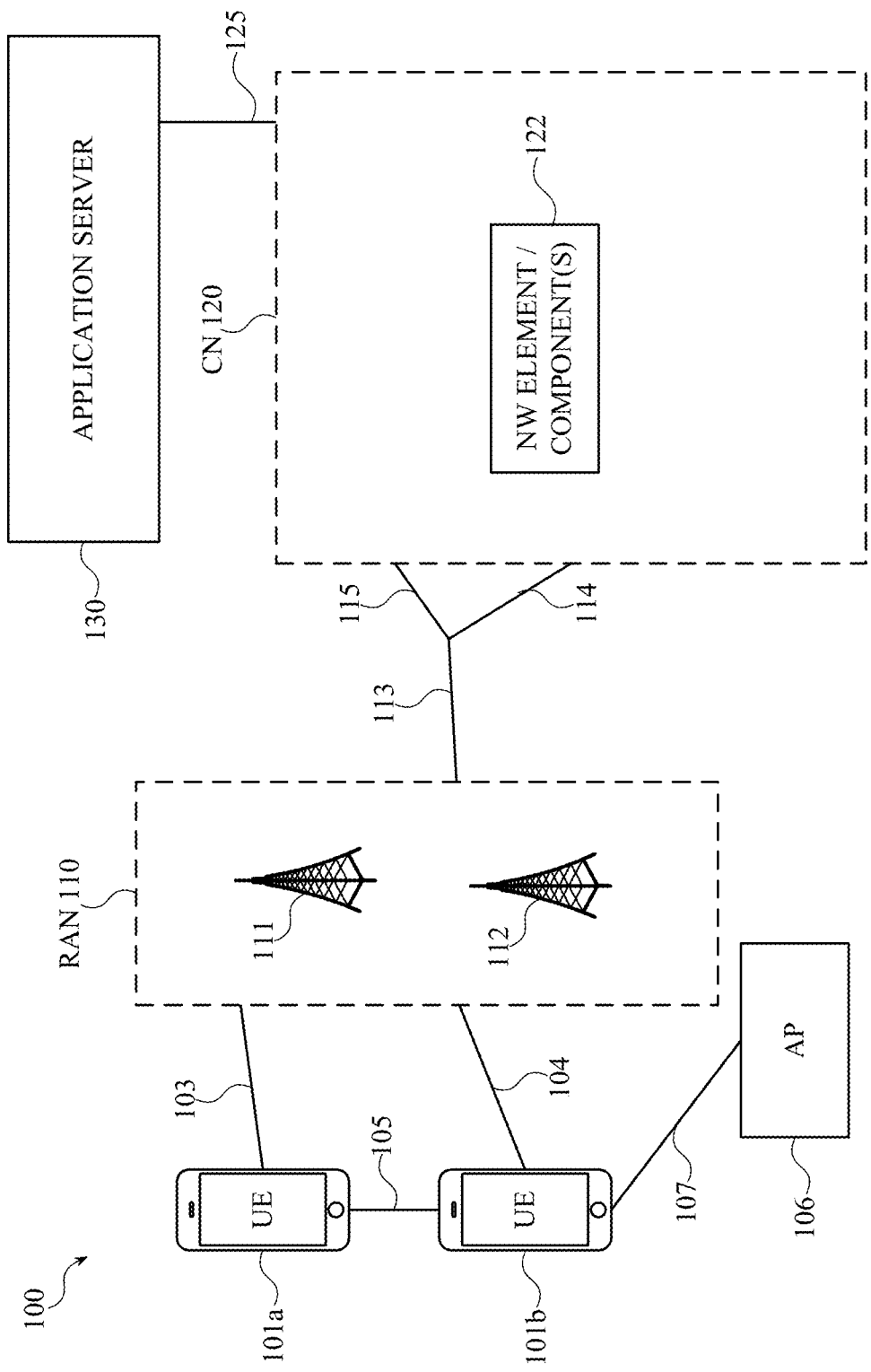
FIG. 1 is an exemplary block diagram illustrating an example of user equipment(s) (UEs) communicatively coupled a network with network components as peer devices useable in connection with various aspects described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like (or similarly ending) reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

In consideration of various concerns for operating new radio (NR) 5G communications in both unlicensed as NR-U or licensed access to fairly coexist with different radio access technologies (RATs) (e.g., Wifi or another RAT) various aspects herein relate to operating a cellular system on an unlicensed spectrum such as in a time division duplex (TDD) system. In particular, embodiments relate to channel sensing from a channel occupancy time (COT) sharing point of view associated with the physical random access channel (PRACH), for example. The COT can comprise a maximum continuous transmission time after channel sensing, for example, and be a defined length of time for unlicensed spectrum.

A next generation NodeB (gNB) and a UE, or other network device (e.g., a load based equipment (LBE) or the like), can operate together to initiate sharing of a same COT, either as a gNB-initiated COT or UE-initiated COT, for a random access procedure. The COT sharing can be utilized in a random access procedure involving four message or less so that at least two or more messages utilized to establish random access can share the same COT. For example, at least two of: a first message, a second message, a third message, a fourth message, or a HARQ feedback that corresponds to the fourth message can share a same COT of a random access procedure or a physical random access channel (PRACH).

For example, a UE can generate the first message comprising a preamble of a random access channel (RACH), and third message based on a resource indicated by the scheduling grant of a second message generated by the gNB. The gNB can generate a fourth message comprising contention resolution information and to transfer the UE to a connected state. The UE can further generate a hybrid automatic repeat request (HARQ) feedback based on the fourth message.

In other aspects, a gNB can configure or the UE can generate different configurations for an uplink (UL) physical channel for an uplink (UL)-to-downlink (DL) channel occupancy time (COT) sharing to coexist with in the unlicensed spectrum or another RAT. For example, the third message can be shared in the same COT as the second message only by having the gap be a duration equal to either about 16 microseconds (us) or about 25 us, while other messages (etc., the first message, fourth message, and hybrid automatic repeat request (HARQ) feedback) may or may not necessarily share the same COT. In another the hybrid automatic repeat request (HARQ) feedback or HARQ_ACK can be shared in the same COT as the fourth message by having the gap be a duration equal to either about 16 us or about 25 us. Additional aspects and details of the disclosure are further described below with reference to figures.

FIG. 1 illustrates an example architecture of a system 100 of a network, in accordance with various embodiments (aspects). The following description is provided for an example system 100 that operates in conjunction with the LTE system standards and 5G or NR system standards as provided by 3GPP technical specifications. However, the example embodiments are not limited in this regard and the described embodiments can apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but can comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, and/or the like.

In some embodiments, any of the UEs 101 can be IoT UEs, which can comprise a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe) or Device-to-Device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 can be configured to connect, for example, communicatively couple, with a Radio Access Network (RAN) 110. In embodiments, the RAN 110 can be an next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communications interface/layer.

Alternatively, or additionally, each of the UEs 101 can be configured with dual connectivity (DC) as a multi-RAT or multi-Radio Dual Connectivity (MR-DC), where a multiple Rx/Tx capable UE may be configured to utilize resources provided by two different nodes (e.g., 111a, 111b, or other network nodes) that can be connected via non-ideal backhaul, one providing NR access and the other one providing either E-UTRA for LTE or NR access for 5G, for example. One node can act as a master node (MN) and the other as the secondary node (SN). The MN and SN can be connected via a network interface and at least the MN is connected to the core network 120. At least one of the MN or the SN can be operated with shared spectrum channel access. All functions specified for a UE can be used for an integrated access and backhaul mobile termination (IAB-MT). Similar for UE 101, the IAB-MT can access the network using either one network node or using two different nodes with EN-DC architectures, NR-DC architectures, or the like.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 can be configured to utilize LTE-WLAN aggregation (LWA) operation and/or LTE-WLAN Radio Level Integration with IPsec Tunnel (LWIP) operation. The LWA operation can involve the UE 101b in radio resource control RRC_CONNECTED being configured by a RAN node 111a, 111b to utilize radio resources of LTE and WLAN. LWIP operation can involve the UE 101b using WLAN radio resources (e.g., connection 107) via IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

The RAN 110 can include one or more access nodes (ANs) or RAN nodes 111a and 111b (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). As used herein, the term "NG RAN node" or the like can refer to a RAN node 111 that operates in an NR or 5G system 100 (for example, a gNB), and the term "E-UTRAN node" or the like can refer to a RAN node 111 that operates in an LTE or 4G system 100 (e.g., an eNB). According to various embodiments, the RAN nodes 111 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 can be implemented as one or more software entities running on server computers as part of a virtual network, which can be referred to as a centralized RAN (CRAN) and/or a virtual baseband unit pool (vBBUP). In these embodiments, the CRAN or vBBUP can implement a RAN function split, such as a Packet Data Convergence Protocol (PDCP) split wherein Radio Resource Control (RRC) and PDCP layers are operated by the CRAN/vBBUP and other L2 protocol entities are operated by individual RAN nodes 111; a Media Access Control (MAC)/Physical (PHY) layer split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 can represent individual gNB-Distributed Units (DUs) that are connected to a gNB-Control Unit (CU) via individual F1 interfaces. In these implementations, the gNB-DUs can include one or more remote radio heads or RF front end modules (RFEMs), and the gNB-CU can be operated by a server that is located in the RAN 110 (not shown) or by a server pool in a similar manner as the CRAN/vBBUP. Additionally or alternatively, one or more of the RAN nodes 111 can be next generation eNBs (ng-eNBs), which are RAN nodes that provide E-UTRA user plane and control plane protocol terminations toward the UEs 101, and are connected to a 5GC via an NG interface.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance with various communication techniques, such as, but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the embodiments (aspects) is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 400 MHz to approximately 2.8 GHz, whereas the unlicensed spectrum can include the 5 GHz band.

To operate in the unlicensed spectrum, the UEs 101 and the RAN nodes 111 can operate using Licensed Assisted Access (LAA), eLAA, and/or feLAA mechanisms. In these implementations, the UEs 101 and the RAN nodes 111 can perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation can include Clear Channel Assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED can include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node can first perform CCA before transmission. Additionally, a backoff mechanism is used to avoid collisions in situations where more than one WLAN node senses the channel as idle and transmits at the same time. The backoff mechanism can be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for downlink (DL) or uplink (UL) transmission bursts including physical downlink shared channel (PDSCH) or physical uplink shared channel (PUSCH) transmissions, respectively, can have an LAA contention window that is variable in length between X and Y extended CCA (ECCA) slots, where X and Y are minimum and maximum values for the contention window sizes (CWSs) for LAA. In one example, the minimum CWS for an LAA transmission can be 9 microseconds (µs or us); however, the size of the CWS and a maximum channel occupancy time (MOOT) (for example, a transmission burst) can be based on governmental regulatory requirements.

The LAA mechanisms are built upon carrier aggregation (CA) technologies of LTE-Advanced systems. In CA, each aggregated carrier is referred to as a component carrier (CC). In some cases, individual CCs can have a different bandwidth than other CCs. In time division duplex (TDD) systems, the number of CCs as well as the bandwidths of each CC can be the same for DL and UL. CA also comprises individual serving cells to provide individual CCs. The coverage of the serving cells can differ, for example, because CCs on different frequency bands will experience different pathloss. A primary service cell or PCell can provide a primary component carrier (PCC) for both UL and DL, and can handle radio resource control (RRC) and non-access stratum (NAS) related activities. The other serving cells are referred to as SCells, and each SCell can provide an individual secondary component carrier (SCC) for both UL and DL. The SCCs can be added and removed as required, while changing the PCC can require the UE 101 to undergo a handover. In LAA, eLAA, and feLAA, some or all of the SCells can operate in the unlicensed spectrum (referred to as "LAA SCells"), and the LAA SCells are assisted by a PCell operating in the licensed spectrum. When a UE is configured with more than one LAA SCell, the UE can receive UL grants on the configured LAA SCells indicating different PUSCH starting positions within a same subframe.

The PDSCH carries user data and higher layer signaling to the UEs 101. The physical downlink control channel (PDCCH) carries information about the transport format and resource allocations related to the PDSCH channel, among other things. It can also inform the UEs 101 about the transport format, resource allocation, and Hybrid Automatic Repeat Request (HARQ) information related to the uplink shared channel. Typically, downlink scheduling (assigning control and shared channel resource blocks to the UE 101b within a cell) can be performed at any of the RAN nodes 111 based on channel quality information fed back from any of the UEs 101. The downlink resource assignment information can be sent on the PDCCH used for (e.g., assigned to) each of the UEs 101.

The PDCCH uses control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an extended (E)-PDCCH that uses PDSCH resources for control information transmission. The EPDCCH can be transmitted using one or more ECCEs. Similar to the above, each ECCE can correspond to nine sets of four physical resource elements known as an EREGs. An ECCE can have other numbers of EREGs in some situations.

The RAN nodes 111 can be configured to communicate with one another via interface 112. In embodiments where the system 100 is an LTE system, the interface 112 can be an X2 interface 112. The X2 interface can be defined between two or more RAN nodes 111 (e.g., two or more eNBs and the like) that connect to evolved packet core (EPC) or core network 120, and/or between two eNBs connecting to EPC 120. In some implementations, the X2 interface can include an X2 user plane interface (X2-U) and an X2 control plane interface (X2-C). The X2-U can provide flow control mechanisms for user data packets transferred over the X2 interface, and can be used to communicate information about the delivery of user data between eNBs. For example, the X2-U can provide specific sequence number information for user data transferred from a master eNB (MeNB) to an secondary eNB (SeNB); information about successful in sequence delivery of PDCP packet data units (PDUs) to a UE 101 from an SeNB for user data; information of PDCP PDUs that were not delivered to a UE 101; information about a current minimum desired buffer size at the SeNB for transmitting to the UE user data; and the like. The X2-C can provide intra-LTE access mobility functionality, including context transfers from source to target eNBs, user plane transport control, etc.; load management functionality; as well as inter-cell interference coordination functionality.

In embodiments where the system 100 is a 5G or NR system, either with a coexisting RAT or not, the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support can include context transfer from an old (source) serving RAN node 111 to new (target) serving RAN node 111; and control of user plane tunnels between old (source) serving RAN node 111 to new (target) serving RAN node 111. A protocol stack of the Xn-U can include a transport network layer built on Internet Protocol (IP) transport layer, and a GPRS Tunnelling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 110 is shown to be communicatively coupled to a core network—in this embodiment, core network (CN) 120. The CN 120 can comprise a plurality of network elements 122, which are configured to offer various data and telecommunications services to customers/subscribers (e.g., users of UEs 101) who are connected to the CN 120 via the RAN 110. The components of the CN 120 can be implemented in one physical node or separate physical nodes including components to read and execute instructions from a machine-readable or computer-readable medium (e.g., a non-transitory machine-readable storage medium). In some embodiments, NFV can be utilized to virtualize any or all of the above-described network node functions via executable instructions stored in one or more computer-readable storage mediums (described in further detail below). A logical instantiation of the CN 120 can be referred to as a network slice, and a logical instantiation of a portion of the CN 120 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, the application server 130 can be an element offering applications that use IP bearer resources with the core network (e.g., Universal Mobile Telecommunications System Packet Services (UMTS PS) domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 can be a 5GC (referred to as "5GC 120" or the like), and the RAN 110 can be connected with the CN 120 via an NG interface 112. In embodiments, the NG interface 112 can be split into two parts, an Next Generation (NG) user plane (NG-U) interface 114, which carries traffic data between the RAN nodes 111 and a User Plane Function (UPF), and the S1 control plane (NG-C) interface 115, which is a signaling interface between the RAN nodes 111 and Access and Mobility Management Functions (AMFs). The Core network CN 120 can also be a 5GC 120.

In embodiments, the CN 120 can be a 5G CN (referred to as "5GC 120" or the like), while in other embodiments, the CN 120 can be an evolved packet core (EPC)). Where CN 120 is an EPC (referred to as "EPC 120" or the like), the RAN 110 can be connected with the CN 120 via an S1 interface 112. In embodiments, the S1 interface 112 can be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
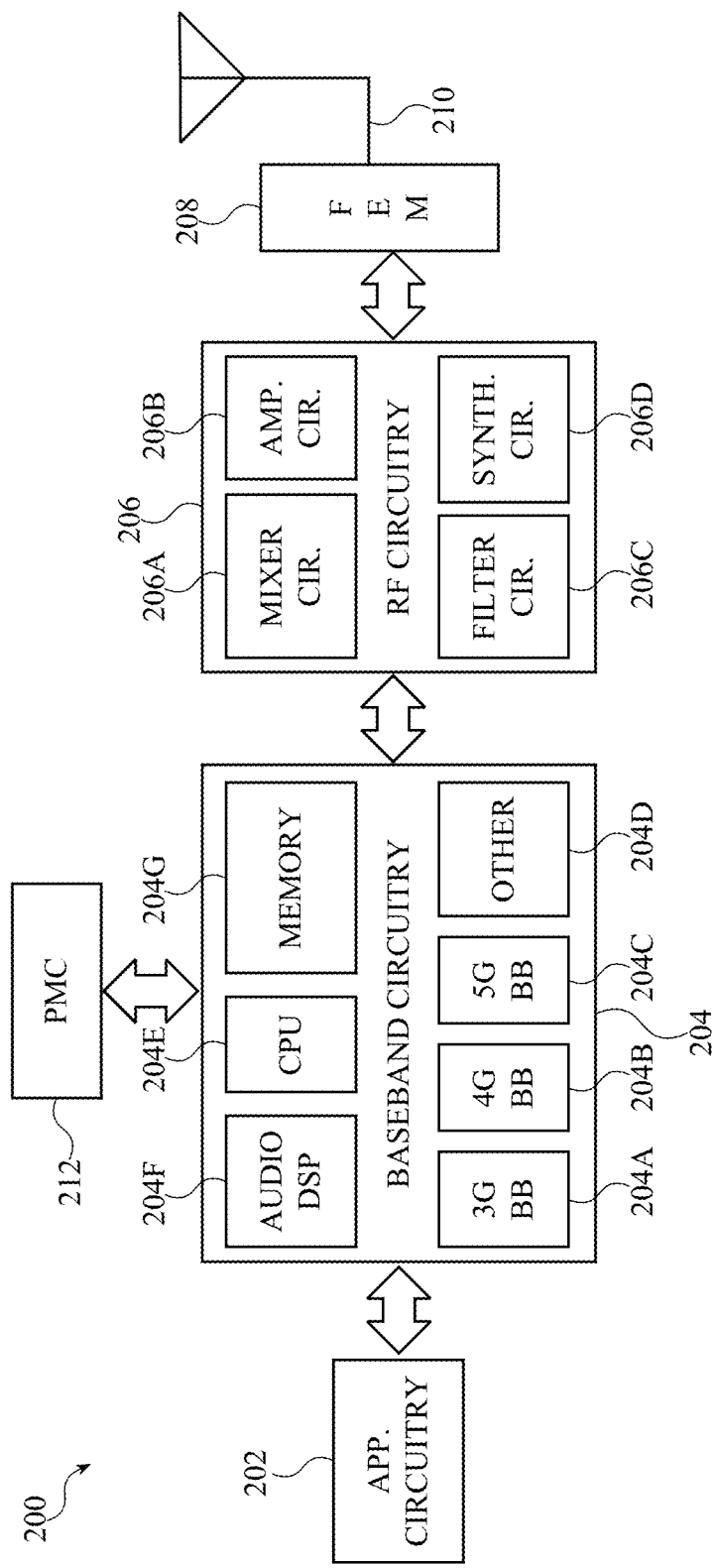
FIG. 2 is an example architecture of a system of a network, in accordance with various aspects.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node, such as UE 101, or RAM node 111. In some embodiments, the device 200 can include less elements (e.g., a RAN node cannot utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In addition, the memory 204G (as well as other memory components discussed herein, e.g., memory, data storage, or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for superheterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage-controlled oscillator (VCO), although that is not a requirement. Divider control input can be provided by either the baseband circuitry 204 or the applications circuitry 202 depending on the desired output frequency. In some embodiments, a divider control input (e.g., N) can be determined from a look-up table based on a channel indicated by the applications circuitry 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 illustrates the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it transitions back to RRC_Connected state.

For low latency/low power operations, the device 200 can be configured to suspend/resume in 5G NR by utilizing the RRC_Inactive state, which can significantly reduce latency and minimize the battery consumption. In the suspend procedure, both the UE and the RAN store information about the UE transition from connected to inactive, along with the UE radio protocol configuration. The resume procedure optimizes the transition from inactive to connected by restoring the UE radio protocol configuration. RAN-based location management and RAN paging make it possible for UEs in the inactive state to move around in an area without notifying the network.

Processors of the application circuitry 202 and processors of the baseband circuitry 204 can be used to execute elements of one or more instances of a protocol stack. For example, processors of the baseband circuitry 204, alone or in combination, can be used to execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
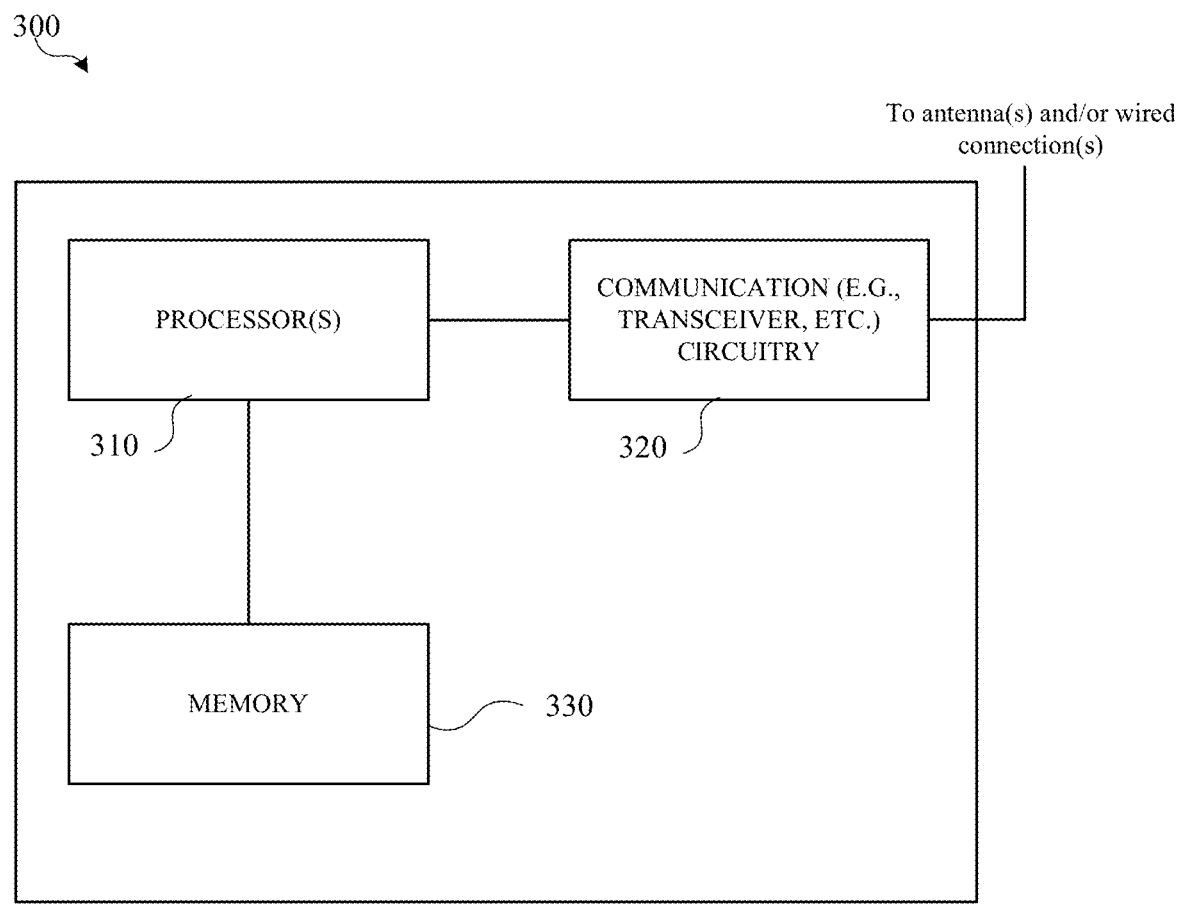
FIG. 3 is an exemplary a simplified block diagram of a user equipment (UE) wireless communication device or other network device/component (e.g., eNB, gNB) in accordance with various aspects.

Referring to FIG. 3, illustrated is a block diagram of a user equipment (UE) wireless communication device (UE) or other network device/component (e.g., gNB, eNB, or other participating network entity/component). The UE device 300 includes one or more processors 310 (e.g., one or more baseband processors) comprising processing circuitry and associated interface(s), transceiver circuitry 320 (e.g., comprising RF circuitry, which can comprise transmitter circuitry (e.g., associated with one or more transmit chains)

and/or receiver circuitry (e.g., associated with one or more receive chains) that can employ common circuit elements, distinct circuit elements, or a combination thereof), and a memory 330 (which can comprise any of a variety of storage mediums and can store instructions and/or data associated with one or more of processor(s) 310 or transceiver circuitry 320).

According to various aspects, the UE 300/101 or RAN node 111 (e.g., gNB) can operate to configure various messages in a random access procedure for sharing a channel occupancy time between two or more of the messages. A first message via/generated by the UE 300, for example, can initiate the random access procedure for a physical random access channel. A second message via the RAN node 111 can indicate reception of a random access preamble in the first message and indicate a scheduling grant for a third message as a random access response (RAR) message over a physical downlink channel (e.g., PRACH, or the like). A third message via the UE 300 can include device identity (e.g., UE id, capability information, or other identifying information) for the RAN node 111, for example. A fourth message via the RAN node 111 can contain contention resolution information and transfer the UE 300 to a connected state. A HARQ feedback via the UE 300 can be generated based on the fourth message. Any two or more of the messages can acquire a COT and shared with one another in an unlicensed spectrum of TDD communications.

Figure 4:
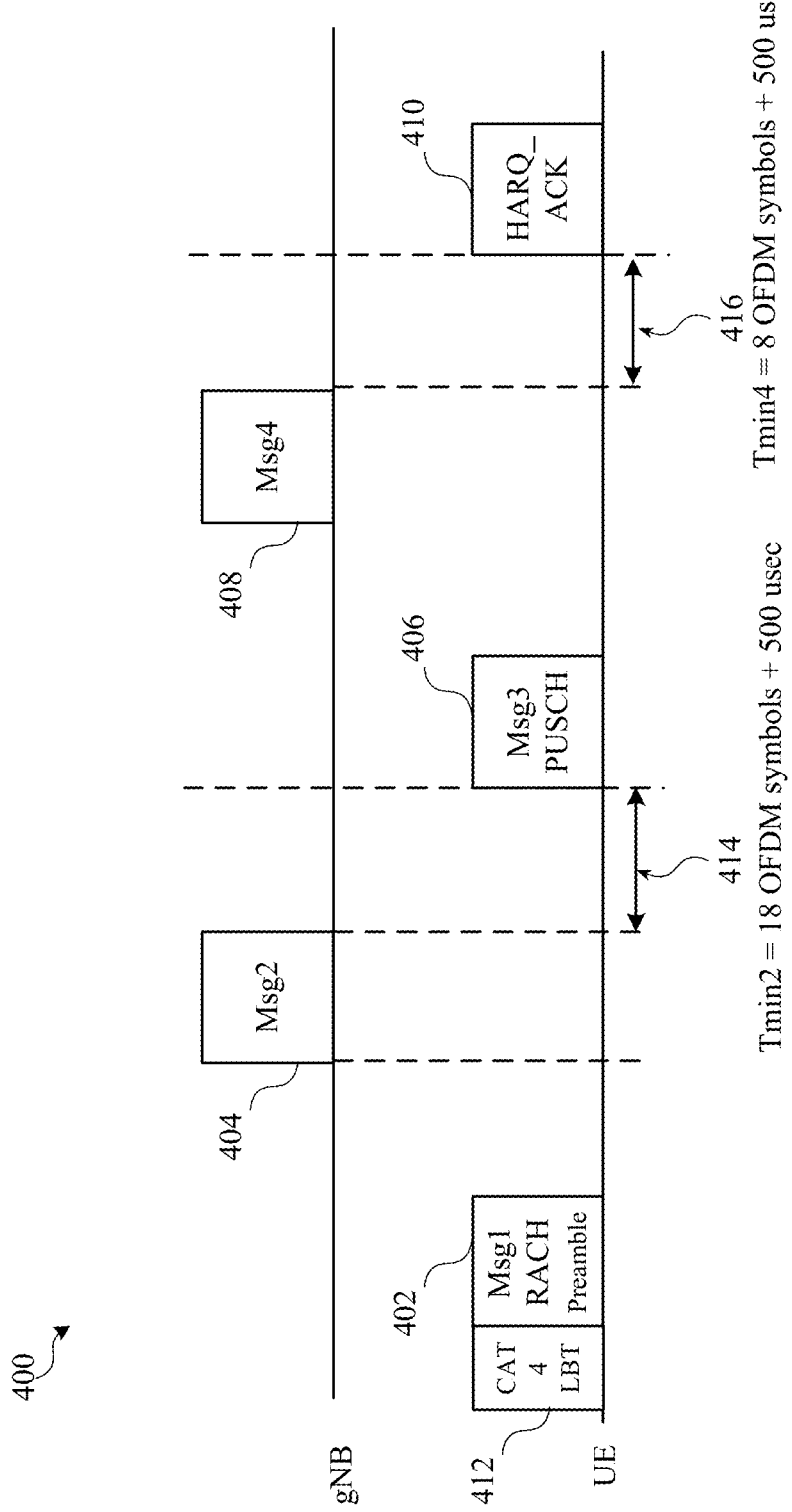
FIG. 4 is an illustration of example messages configured for random access procedures for channel occupancy time (COT) sharing in accordance with various aspects.

Referring to FIG. 4, illustrated is an example of random access procedure message configurations 400 in COT sharing depending on a gNB-initiated COT or a UE-initiated COT in the unlicensed spectrum according to various aspects. One of the major limiting factors in wireless innovation is the availability in spectrum. To mitigate this, the unlicensed spectrum can be utilized to expand the availability of LTE. In this context, one of the major enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system.

Now that many of the main building blocks for the framework of NR have been established, communications systems can be configured to allow this to also operate on unlicensed spectrum. The objective of various studies has been to study NR-based operation in the unlicensed spectrum including, but not limited to: 1) Physical channels inheriting the choices of duplex mode, waveform, carrier bandwidth, subcarrier spacing, frame structure, and physical layer design made as part of the NR study and avoiding unnecessary divergence with other decisions made; This can consider unlicensed bands both below and above 6 GHz, up to 52.6 GHz; unlicensed bands above 52.6 GHz to the extent that waveform design principles remain unchanged with respect to below 52.6 GHz bands, as well as similar forward compatibility principles made in the NR work items (WI). Other objects can include: 2) initial access, channel access, and Scheduling/HARQ, and mobility including connected/inactive/idle mode operation and radio-link monitoring/failure; and 3) coexistence methods within NR-based and between NR-based operation in unlicensed and LTE-based LAA and with other incumbent RATs in accordance with regulatory requirements in e.g., 5 GHz, 37 GHz, 60 GHz bands. Coexistence methods already defined for 5 GHz band in LTE-based LAA context could be assumed as the baseline for 5 GHz operation. Enhancements in 5 GHz over these methods should not be precluded. NR-based operation in unlicensed spectrum should not impact deployed Wi-Fi services (data, video and voice services) more than an additional Wi-Fi network on the same carrier.

The various aspects (embodiments) can be utilized to enhance NR when operating in unlicensed spectrum. One of the challenges in this case is that the wireless communication system should maintain fair coexistence with other incumbent technologies, and in order to do so, depending on the particular band in which it might operate, some restriction could be taken into account when designing this system. For instance, if operating in the 5 GHz bands or higher, a listen before talk (LBT) procedure could be performed in at least some parts of the world to acquire the medium before a transmission can occur. For example, three ways to acquire the channel can include: A) CAT-1 LBT, no listen before talk; B) CAT-2 LBT, listen before talk without random backoff; C) CAT-4 LBT, which is equivalent to CAT-2 LBT plus random back-off with a variable size of contention window.

COT sharing in the new radio unlicensed spectrum (NR-U) can be configured enable by the RAN node 111 and UE 101 to share the medium without having to perform CAT-4 LBT every time the medium is accessed. This can allow for more efficient use of the medium or unlicensed spectrum. COT sharing can be done, for example, in Wi-Fi between an access point (AP) and a Wi-Fi station (STA), which is capable of utilizing the 802.11 standard communication when a data packet is sent, and its Ack is sent a short interface space (SIFS) duration later without performing LBT. In Wi-Fi, an Ack (e.g., about 14 bytes) transmitted at 6 Mbps can have a duration of about 44 us and a Block Ack (BA, 32 byte, with BA Information that consists of 10 bytes of Compressed Block Ack information) transmitted at 6 Mbps has a duration of about 68 us. For example, Table 10-5 and FIG. 9-35 of 802.11-2016 references further details hereby incorporated in its entirety.

In various embodiments herein in NR-U, the RAN node 111 can be configured to share the COT with the UE 101, and vice-versa, the UE 101 with the RAN node 111. The various embodiments or aspects herein can pertain to random-access procedures, which can include at least four messages, for example, as illustrated in the random access procedure messages 400 of FIG. 4.

In various aspects, the UE 101 can operate to generate a first message 402 that comprises a preamble of a random access message, and encode the first message to the RAN node 111, for example. The UE 101 can receive a second message 404 in response to transmitting the first message 402 that indicates a reception of the preamble, along with a time adjustment and a resource for generating a third message 406. The time adjustment can indicate a timing advance value, as a time delay or advance value, for example, related to, or for generating the next message (e.g., Msg 3, 406). The UE 101 can then receive a fourth message 408 as configured by the RAN node 111, for example, in response to it receiving the third message 406. The UE 101 then generates a HARQ feedback 410 (e.g., a HARQ acknowledgement (ACK)) that corresponds to the fourth message 408.

In various aspects, the first message 402 can comprise a Physical Random Access Channel (PRACH) (a.k.a., Message 1, or Msg1) transmission, in which the preamble is sent by the UE 101. The first message 402 can be initiated by a CAT 4 LBT 412 and not be performed again during the process by the RAN node 111 as a part of COT sharing or a window of COT sharing. The second message 404 can comprise a Random-Access Response (RAR) (a.k.a., Message 2, or Msg2) by the RAN node 111 indicating reception of the preamble and providing a time-adjustment command.

The second message 404 can be transmitted as a PDCCH/PDSCH and can further comprise a scheduling grant that indicates one or more resources assigned for Message 3 406. A time threshold or predefined time can be configured between the second message 404 or an end of the second message 404 to the beginning of the third message 406 can be designated as Tmin2 414, where Tmin2 can be 18 OFDM symbols plus 500 us. If the UE 101 does not detect a second message (e.g., RAR) 404 within a particular time window (e.g., Tmin2, or the other time), the first message (e.g., PRACH) 402 can be retransmitted with a higher power than the first transmission.

Message 3 (406) can be generated by the UE 300 and comprise a device identity, which can be time spaced at least N1+N2+0.5 ms from the second message 404 described above, where N1 corresponds to a PDSCH reception time for UE processing capability 1, and N2 corresponds to a PUSCH preparation time for UE processing capability 1 that is detailed in TS 38.214, for example. Message 4 (Msg 4 408) can be generated by the RAN node 111 to comprise information that can resolve any contention resolution and further be configured to transfer the UE 101 to a connected state (RRC_Connected). A HARQ feedback or HARQ_Ack 410 can also be transmitted by the UE 101 for the HARQ feedback based on or corresponding to message 4 (408). The minimum time between the last symbol of message 4 and the HARQ_Ack or HARQ feedback can be N1+0.5 ms, where N1 is corresponds to PDSCH reception time for UE processing capability 1. For example, this minimum time can be Tmin4 416 and equal to 8 OFDM symbols plus 500 us.

The value of N1 can depend on subcarrier spacing (SCS) $\mu$ (mu)=0/1/2/3 value below and correspond to 15/30/60/120 kHz SCS), which can be given by the Table 500 of FIG. 5 as similar in TS 38.214. Here, depending on the mu value, N1 can take on different values for demodulation reference signal (DMRS) downlink configuration (DMRS-Downlink Config) in both mapping Type A and mapping Type B, for example for PDSCH. The value of N2 can depend on SCS (mu value below) and is given by the table 600 of FIG. 6 as following TS 38.214. Here, the PUSCH preparation time for PUSCH timing capability 1 is given in number of symbols for each mu value.

When operating in unlicensed spectrum, one challenge is for the communication system to maintain fair coexistence with other incumbent technologies, and in order to do so, depending on the particular band in which it might operate, some restriction might be taken into account. For example, if operating in the 5 GHz band, an LBT procedure is to be performed to acquire the medium before a transmission can occur. For example, three ways to acquire the channel may include: CAT-1 LBT, CAT-2 LBT, or CAT-4 LBT, for example. COT sharing in NR-U allows for a gNB and UE to share the medium without having to perform CAT-4 LBT every time the medium is accessed. This allows for more efficient use of the medium.

Figure 7:
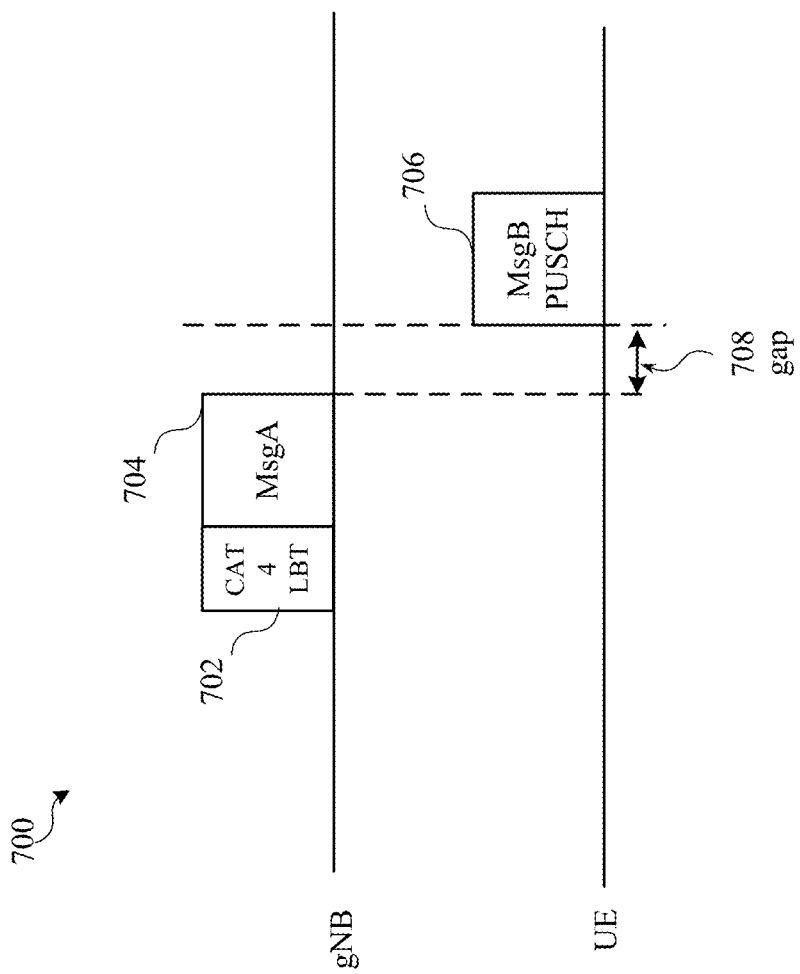
FIG. 7 is an illustration of an example messages configured for random access procedures for a next generation NodeB (gNB) initiated channel occupancy time COT sharing in accordance with various aspects.

FIG. 7 illustrates an example of a gNB-initiated COT in accord with various aspects. When operating a cellular system on an unlicensed spectrum in a TDD system, the channel sensing from a COT sharing point of view associated with PRACH can be configured. In particular, two kinds of COT sharing in NR-U can be configured: a gNB-initiated COT 700, where the gNB acquires the channel (e.g., via CAT 4 LBT 702), and a UE-initiated COT (e.g., communications 600 of FIG. 6), where the UE acquires the channel. Within a gNB-initiated COT 600, an UL burst (e.g., Msg B 706) for a UE 101 consisting of one or more of PUSCH, PUCCH, PRACH can have CAT 1 LBT if the gap 708 from the end of the DL transmission 704 (e.g., Msg A) to the beginning of the UL burst 706 is not more than 16 us and CAT2 LBT when the gap 708 is not greater than 25 us, for example.

In one embodiment, the second message 404 and third message 406 in FIG. 4 could share the COT. In another embodiment, the fourth message 408 and its corresponding HARQ_ACK 410 could also share the COT. In some embodiments, for initiation of a COT by the UE 101, the channel access schemes in the following Table can be used:

TABLE 1

| Channel access schemes for initiating a COT by UE as LBE device | | |
|---|---|---|
| | Cat 2 LBT | Cat 4 LBT |
| PUSCH (including at least UL-SCH with user plane data) | N/A except for the cases discussed in Note 2 below | Channel access priority class is selected according to the data |
| SRS-only | N/A | Cat4 with lowest channel access priority class value (as in LTE eLAA) |
| RACH-only | (see Note 2) | Cat4 with lowest channel access priority class value |
| PUCCH-only | (see Note 2) | Cat4 with lowest channel access priority class value |

Note
1 of Table 1: If the COT includes multiple signals/channels with different channel access categories/priority classes, the highest channel access priority class value and highest channel access category among the channel access priority classes and channel access categories corresponding to the multiple signals/channels can apply. Channel categories an include logical channels, transport channels, and physical channels, or the like, for example.
Note
2 of Table 1: Applicability of a channel access scheme other than Cat 4 for the following signals/channels can be configured. In one example, (1) UL control information including UCI only on PUSCH, e.g. HARQ-ACK, Scheduling Request, and Channel State Information can be configured. Additionally, or alternatively, Random Access can also be configured to utilize schemes other than Cat 4 also.

In various aspects herein, there exists a minimum time from the end of message 2 (e.g., 404, or MsgA 704) to the beginning of message 3 (e.g., 406 or MsgB 706) that can comprise at least 18 OFDM symbols+0.5 ms. This is at least 1.786/1.143/0.821/0.66 ms when operating in 15 kHz/30 kHz/60 kHz/120 kHz SCS, for example. In some embodiments (e.g., according to regulation ETSI EN 301 892 v2.1.1 (2017-05)), the highest priority class number (i.e. the lowest priority class) can have a maximum COT limit of 2 ms.

FIG. 8 illustrates a Table 800 2 that comprises minimum and maximum contention window sizes and maximum COT times for different classes and positions for configuring LBT schemes in COT sharing. comprises such information for configuration. As noted, a maximum COT of 6 ms can be increased to 8 ms by inserting one or more pauses by the UE 101 or RAN node, for example. The minimum duration of a pause can be a 100 us. The maximum duration channel occupancy before including a pause can be 6 ms. A pause duration is not necessarily included in the COT. The maximum COT of 6 ms, as noted at note 2, can be increased to 10 ms by extending CW to CW×2+1 when selecting a random number q for any backoff(s) that precede the channel occupancy that may exceed 6 ms or which follow the channel occupancy that exceeded 6 ms. The choice between preceding or following the channel occupancy can remain unchanged during the operation time of the device. The values for p0, CWmin, CWmax can be minimum values, in which greater values could be configured in the COT sharing of a random access procedure, for example.

In another aspect, the second message 404 can include a COT-sharing indication bit in the DCI for scheduling. If this bit is set to 0, then COT sharing is not enabled and if it is set to 1, then COT sharing is enabled, or vice versa, if this bit is set to 1, then COT sharing is not enabled and if it is set to 0, then COT sharing is enabled. Alternatively, or additionally, COT-sharing could be configured via RRC or higher layer signaling.

If COT sharing is enabled, various aspects can be configured. First, extra information could be sent by the gNB 110, and is denoted by "ExtraK", for the K-th Msg in so that the gap is less than or equal to 16 us. This extra information could be sent to the same UE 101 or to other UEs. Another embodiment is to have 1 or 2 new bits in RAR message with a PDCCH/PDSCH (Msg2) 404 to indicate to the UE 101 that Msg3 406 should be preceded by either CAT1 LBT, CAT2 LBT, or CAT4 LBT. Second, the duration from the end of Msg2 404 to the beginning of Msg3 406 can be configured to be at least 100 us, which would allow for a "paused COT" to exist. In this case, the UE is required to perform CAT2 LBT starting 25 us from the allocated slot.

The RAR content of the second message (e.g., RAR message) 404 can be similarly found in Table 8.2-1 in TS 38.213 as follows, but can be modified to take the extra signaling information into account: Table 8.2-1: Random Access Response Grant Content field size:

| RAR grant field | Number of bits |
| --- | --- |
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |

FIGS. 9 and 10 illustrate modifications 900 and 1000 to Table 8.2-1 for a RAR grant field and number of bits in various aspects. Table 900 of FIG. 9 illustrates an extra set of bits in a RAR grant field, in which the second to the last row can include COT sharing as one bit, and the last row a single bit for indicating whether a CAT 1 LBT or a CAT2 LBT is to be performed by the UE 101 after the second message 404. In contrast, the table 1000 of FIG. 10 adds a row to designate CAT1, CAT2, or CAT4 LBT based on a position of two bits. In this manner, the UE 101 can check the channel and configure the third message 406 based upon operation of the particular designated LBT scheme.

Figure 11:
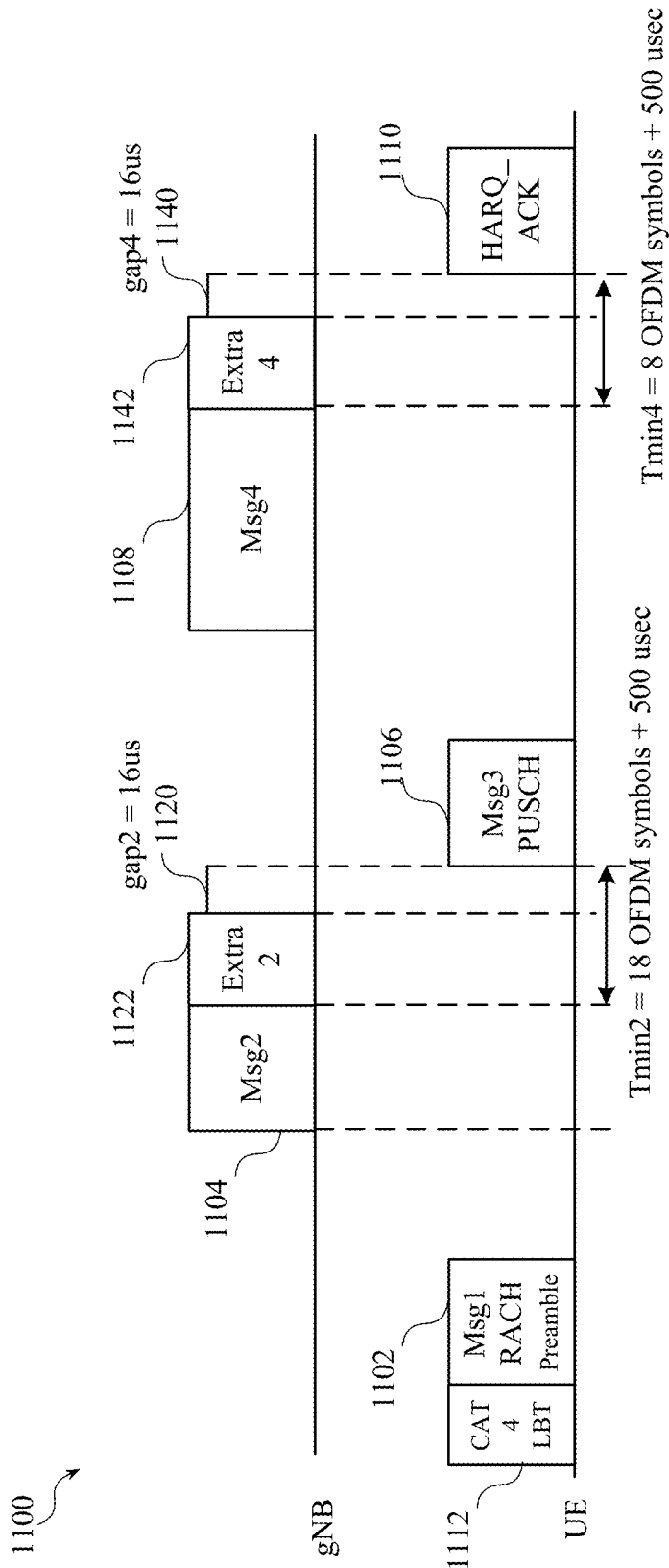
FIG. 11 is another illustration of example messages configured for random access procedures for channel occupancy time (COT) sharing in accordance with various aspects.

FIG. 11 illustrates an example COT sharing 1100 for a random access procedure, where the fourth message 1108 (e.g., fourth message 408) and HARQ_ACK 1110 (e.g., 410) COT can be configured for COT sharing with gaps 1140 equal to or less than a value of 16 us, for example. Additionally, there exists a minimum time from the end the fourth message 1108 to the beginning of HARQ_ACK feedback 1110 that comprises at least 8 OFDM symbols+0.5 ms. This minimum time can be equal to 1.071/0.786/0.643/0.571 ms when operating with 15 kHz/30 kHz/60 kHz/120 kHz SCS. To fill this gap 1140 or a gap 1120 between the second message 1104 and the third message 1106, extra information 1122 or 1142, respectively, could be sent by the RAN node 111, as denoted by "Extra2" or "Extra4", respectively. If a COT sharing bit is present, an additional bit could signal whether CAT1 or CAT2 LBT is to be used as in FIG. 9 and Table modification 900. If COT sharing bit is not present, 2 bits in the DCI could be allocated to indicate whether HARQ-ACK should be preceded by either CAT1, CAT2, or CAT4 LBT, as in Table 1000 of FIG. 10. One example could be to configure one of the Reserved fields with Index 33-46 in Table 6.2.1-1 "Values of LCID for DL-SCH" in 38.321, illustrated as Table 1200 in FIG. 12, for example.

Figure 13:
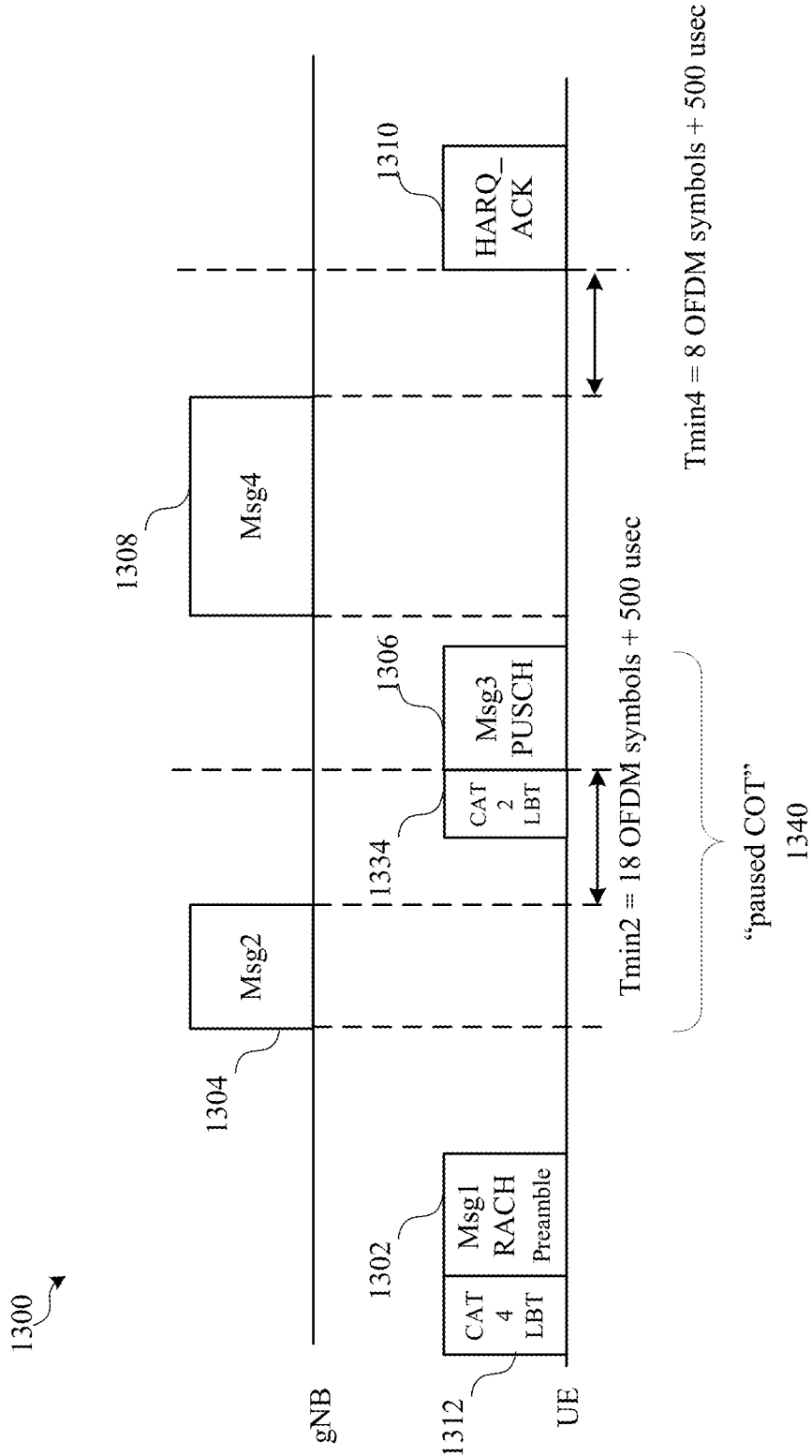
FIG. 13 is another illustration of example messages configured for random access procedures for channel occupancy time (COT) sharing in accordance with various aspects.

Referring to FIG. 13, illustrated is an example COT sharing 1300 for random access procedures where a maximum COT of 6 ms can be increased to 8 ms by inserting one or more pauses 1340 by the UE 101 or RAN node 111, for example. The minimum duration of a pause can be a 100 us, for example, or other duration. A maximum COT of 6 ms can be also be increased to 10 ms by extending CW to CW×2+1 when selecting a random number q for any back-off(s) that precede the channel occupancy that may exceed 6 ms or which follow the channel occupancy that exceeded 6 ms. The choice between preceding or following the channel occupancy can remain unchanged during the operation time of the device.

In another aspect, the second message 404 as 1304 in FIG. 13 can include a COT-sharing indication bit in the DCI for scheduling. If this bit is set to 0, then COT sharing is not enabled and if it is set to 1, then COT sharing is enabled, or vice versa. If COT sharing is enabled, various aspects can be configured. First, extra information could be sent by the RAN node 111, and is denoted by "ExtraK", as a part of any one of the messages in so that the gap is less than or equal to 16 us. This extra information could be sent to the same UE 101 or to other UEs. Another embodiment is to have 1 or 2 new bits in RAR message with a PDCCH/PDSCH (Msg2) 404 to indicate to the UE 101 that Msg3 406 as 1306 in FIG. 13 should be preceded by either CAT1 LBT, CAT2 LBT, or CAT4 LBT, which is designated as a CAT2 LBT 1334 in FIG. 13. Second, the duration from the end of Msg2 404 to the beginning of Msg3 406 can be configured to be at least 100 us, which would allow for the "paused COT" 1340 to exist. In this case, the UE is required to perform CAT2 LBT 1334 starting 25 us from the allocated slot.

Figure 14:
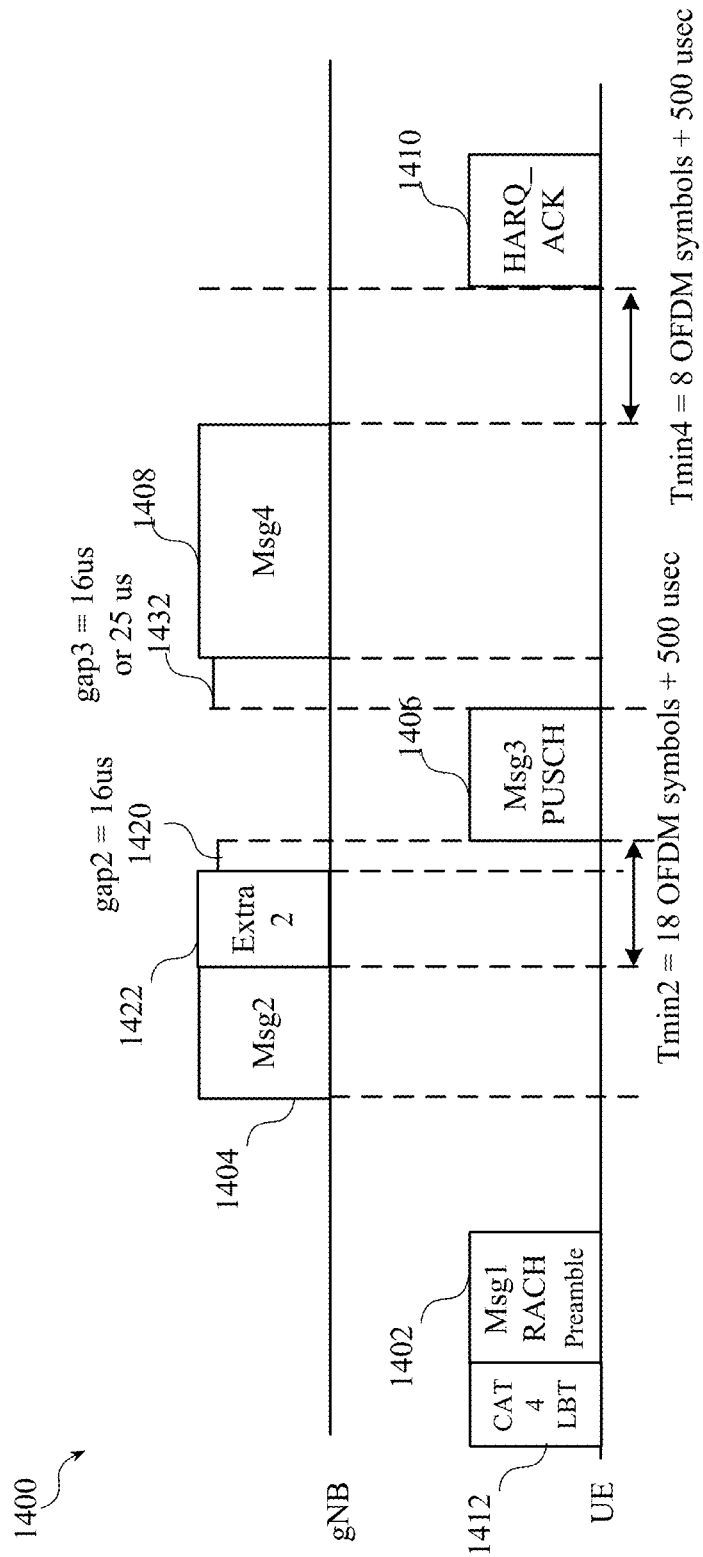
FIG. 14 is another illustration of example messages configured for random access procedures for channel occupancy time (COT) sharing in accordance with various aspects.

Referring to FIG. 14, illustrated is an example COT sharing 1400 for random access procedures. Some embodiments can include the second message 1404, the third message 1406, and the fourth message 1408 COT sharing (in the same COT) with gaps 1420 and 1432 equal to either 16 us or 25 us. If gap3 1432 is less than 16 us, then Msg4 1408 can be transmitted using CAT1 LBT. If gap3 is greater than 16 us, then Msg4 1408 can be transmitted using CAT2 LBT. The first message 1402 and the preceding LBT 1412 can be unchanged as a UE initiated COT for example. An extra information 1422 can also be inserted to only the second message 1404 to dynamically satisfy the conditions for gap2 1420, and only condition the LBT preceding the fourth message 1408 based on the gap3 1432, for example. HARQ_Ack 1410 can then be sent in response to the fourth message 1408.

Figure 15:
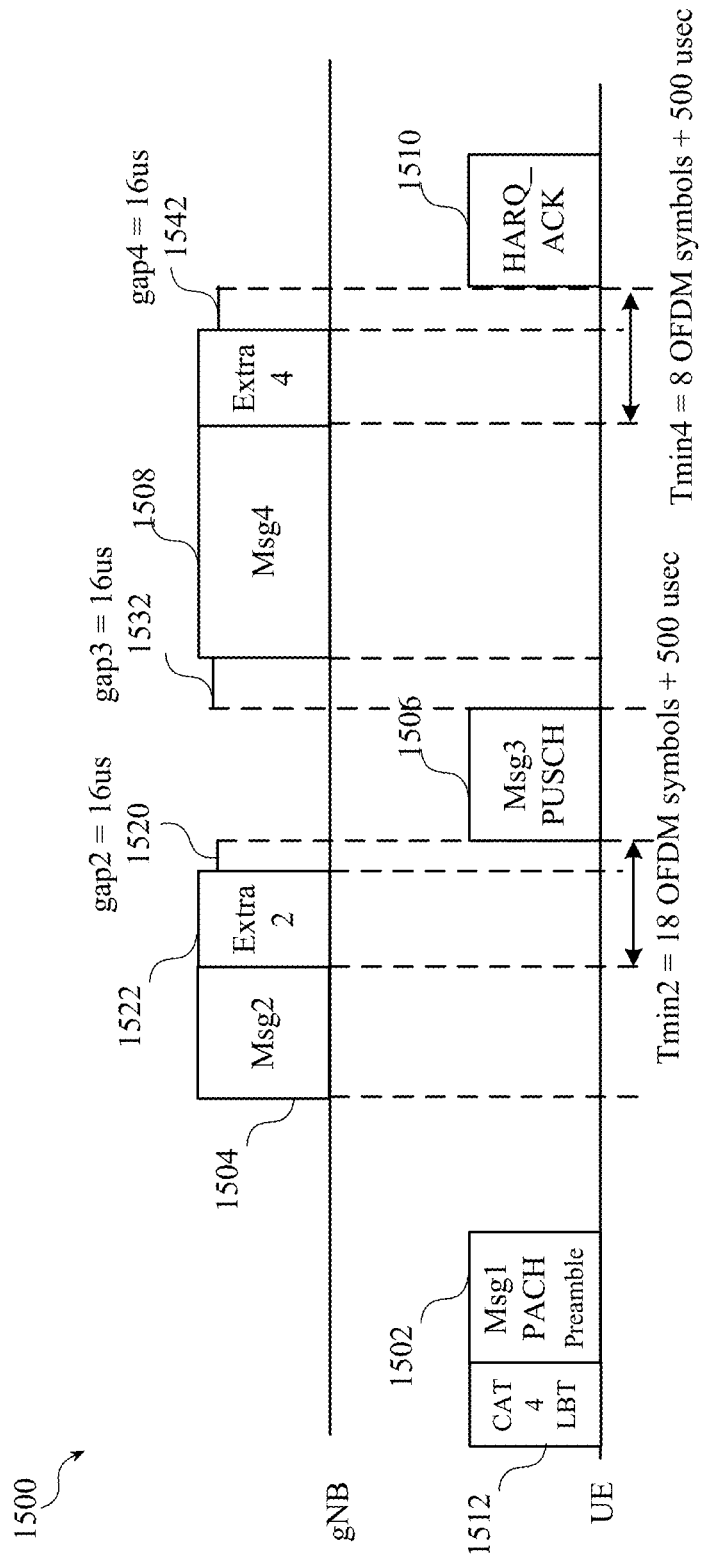
FIG. 15 is another illustration of example messages configured for random access procedures for channel occupancy time (COT) sharing in accordance with various aspects.

Referring to FIG. 15, illustrated is an example COT sharing 1500 for random access procedures. The first message 1502 is preceded by CAT4 LBT 1512, and then the second message 1504 follows for the third message 1506 and fourth message 1508. HARQ_Ack 1510 follows the fourth message 1508 Some embodiments can include the second message 1504, the third message 1506, and the fourth message 1508 COT sharing (in the same COT), and HARQ_ACK 1510 COT sharing with gaps 1520, 1532, and 1542 equal to 16 us in between successive transmissions. Some embodiments may include Msg2, Msg3, Msg4, and HARQ_ACK COT sharing with gaps either less than 16 us or greater than or equal to 16 us in between successive transmissions.

Figure 16:
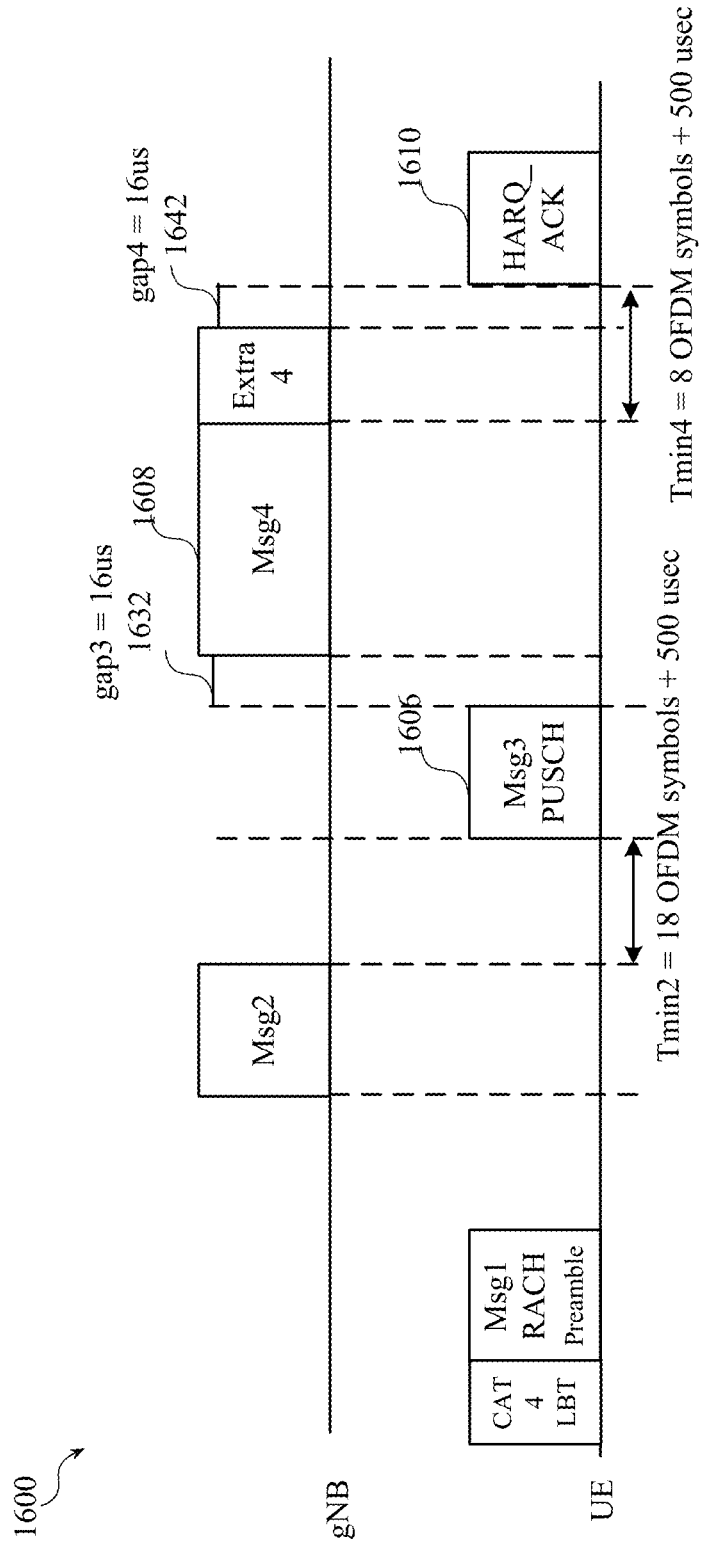
FIG. 16 is another illustration of example messages configured for random access procedures for channel occupancy time (COT) sharing in accordance with various aspects.

Referring to FIG. 16, illustrated is an example COT sharing 1600 for random access procedures. Some embodiments can include UE COT sharing and being indicated in Msg3 1606 so that Msg3 1606, Msg4 1608, and HARQ_ACK 1610 are shared in a same COT. Here, a COT sharing bit can be added in the UCI inside Msg3 1606 by the UE 101 to indicate to the RAN node 111, for example, that COT sharing is allowed for Msg4 1608. If COT sharing bit is present, an additional bit could signal whether CAT1 or CAT2 LBT is to be used. If COT sharing bit is not present, 2 bits in the UCI could be allocated to indicate whether CAT1, CAT2, or CAT4 LBT are to be used. Further, due to the latency associated with Msg3 1606 transmission and HARQ_ACK 1610, highest channel access priority with 2 ms COT is not likely. The channel access priority class (CAPC) could then be reduced in this case. In another embodiment, the desired CAPC could be indicated. Further, gaps 1632 and 1642 can be about 16 us.

Figure 17:
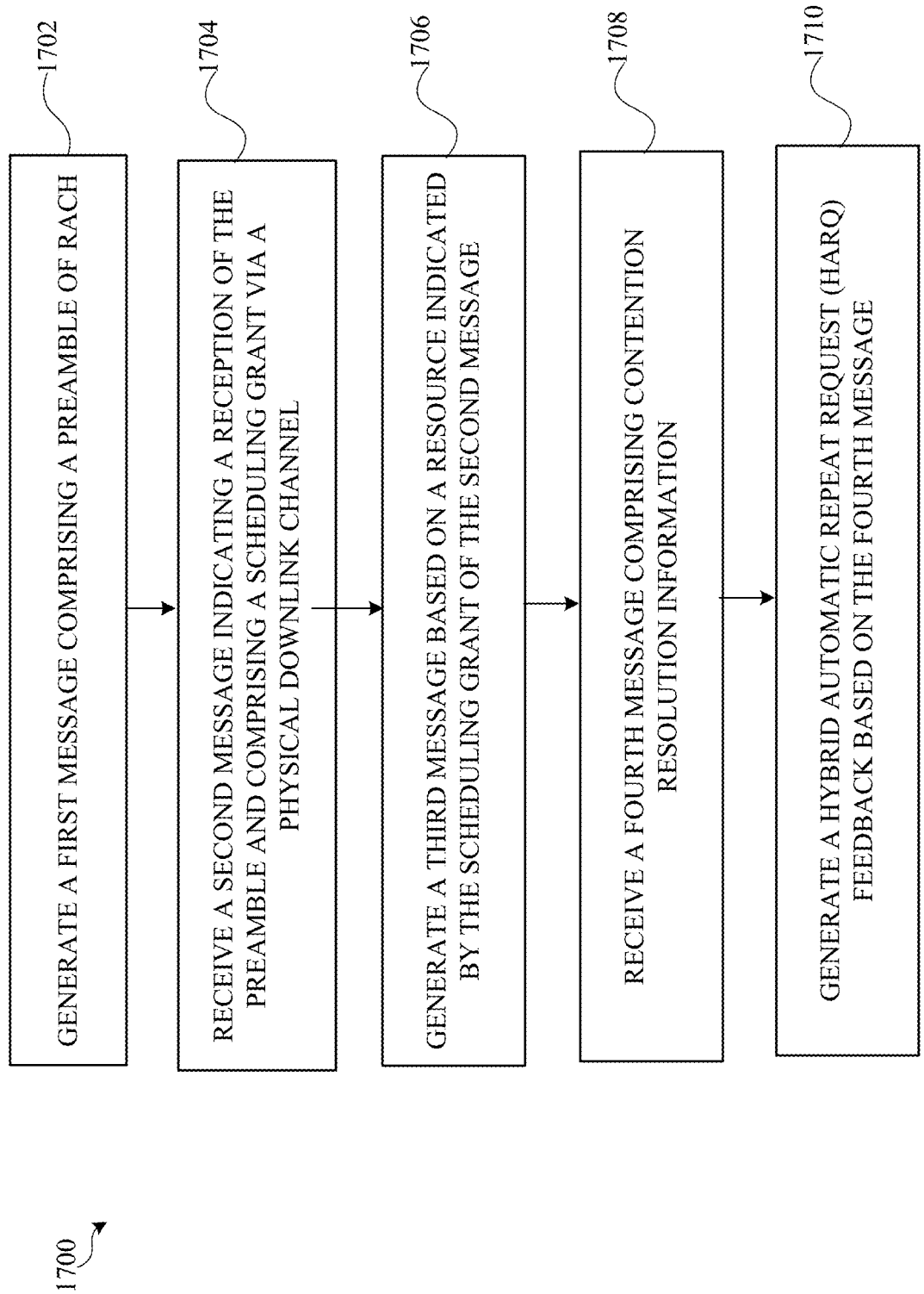
FIG. 17 is another block diagram illustrating an example process flow for COT sharing in unlicensed spectrum according to various aspects.

Referring to FIG. 17, illustrated is an example process flow 1700 for a network device or component (e.g., UE 101, RAN node 111, AP 106 or other network component) to perform random access procedures with NR-U in TDD for COT sharing. The process flow 1700 initiates at 1702 with a UE 101 generating a first message comprising a preamble of a random access channel (RACH). At 1704, the process flow 1700 comprises receiving a second message indicating a reception of the preamble and comprising a scheduling grant via a physical downlink channel. At 1706, the process flow 1700 comprises generating a third message based on a resource indicated by the scheduling grant of the second message. At 1708, the process flow 1700 comprises receiving a fourth message comprising contention resolution information. At 1710, the process flow includes generating a hybrid automatic repeat request (HARQ) feedback based on the fourth message. At least two of: the second message, the third message, the fourth message, or the HARQ feedback can share a channel occupancy time (COT) in a random access procedure.

The COT can comprise a gNB-initiated COT or a UE-initiated COT. In response to the COT comprising a gNB-initiated COT, the operations further comprise generating an uplink (UL) transmission within the COT comprising a CAT1 listen-before-talk (LBT) or a CAT2 LBT based on a duration of a gap between a downlink (DL) transmission and the UL transmission.

In one aspect, the COT can be shared with the third message and the second message, or with the fourth message and the HARQ feedback that corresponds to the fourth message. In some aspects, a COT sharing bit can be generated in an uplink control information (UCI) from the third message, or the COT sharing bit can be in a DCI to indicate that COT sharing is enabled for the random access procedure in the unlicensed spectrum. In response to the COT sharing being enabled, an extra information can be received that configures a gap between at least one of: the second message and the third message, or the fourth message and the HARQ feedback, for example.

In response to COT sharing being enabled, the third message can be configured according to a CAT1, CAT2, or CAT 4 LBT preceding the third message based on an LBT indication in a random access response (RAR) message as the second message, and a duration can be configured from an end of the second message to a beginning of the third message to enable a paused COT therebetween.

Figure 18:
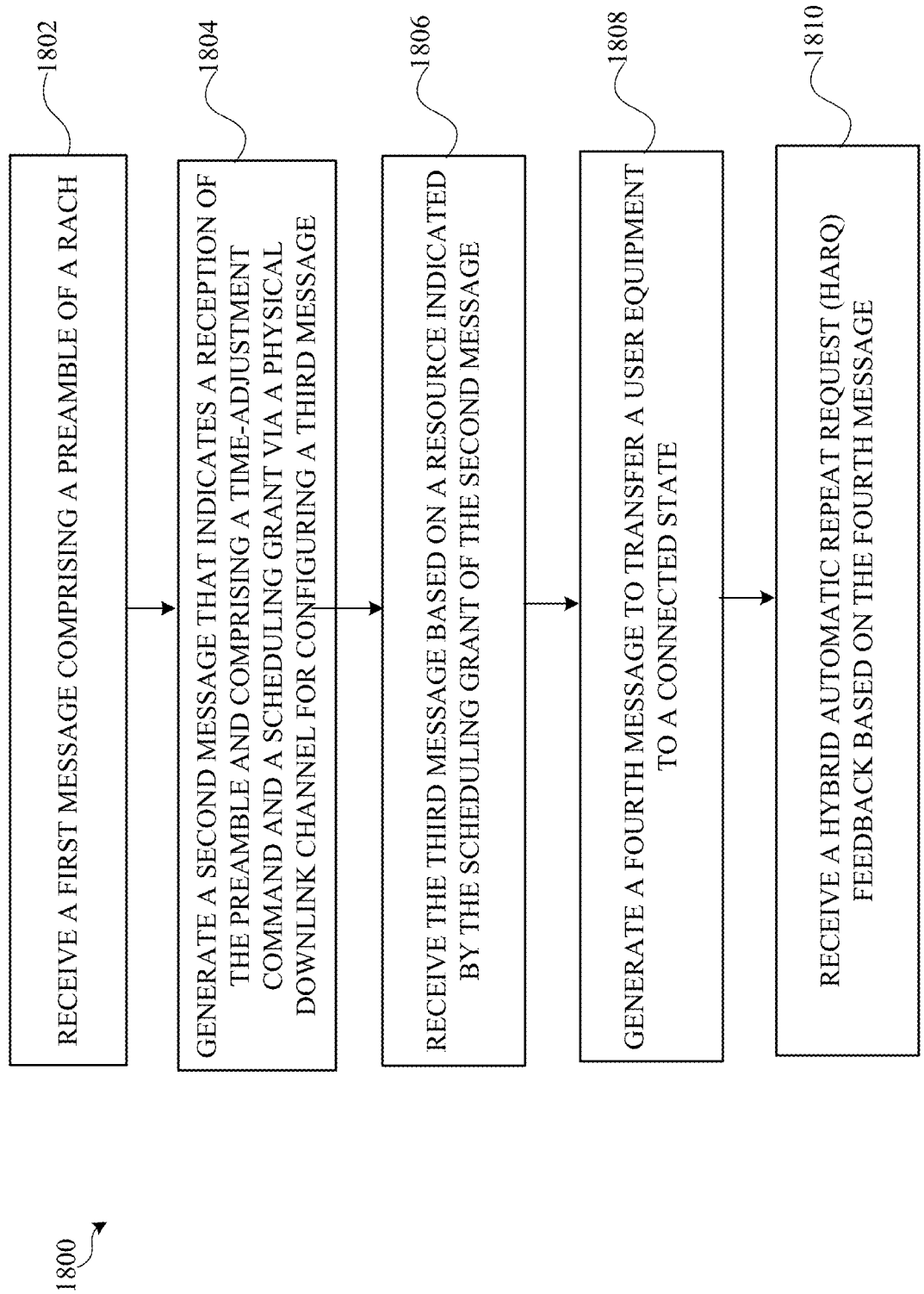
FIG. 18 is another block diagram illustrating an example process flow for COT sharing in unlicensed spectrum according to various aspects.

Referring to FIG. 18, illustrated is an example process flow 1800 for a network device or component (e.g., UE 101, RAN node 111, AP 106 or other network component) to enable random access procedures with NR-U in TDD COT sharing. The process flow 1800 initiates at 1802 with a RAN node 111 configuring a random access procedure by sharing a channel occupancy time (COT) by receiving a first message comprising a preamble of a RACH. At 1804, the process flow 1800 can comprise generating a second message that indicates a reception of the preamble and comprising a time-adjustment command and a scheduling grant via a physical downlink channel for configuring a third message. At 1806, the process flow 1800 can comprise receiving the third message based on a resource indicated by the scheduling grant of the second message. At 1808, the process flow 1800 can comprise generating a fourth message to transfer a user equipment to a connected state. At 1810, the process flow 1800 can comprise receiving a HARQ feedback based on the fourth message.

The first message can comprise a PRACH message, the second message can comprise RAR message, the third message can comprise a device identity, and the fourth message comprise contention resolution information. A scheduling grant can be configured in the second message that enables configuring of the third message in a same COT of at least one of: the second message, the third message, the fourth message or the HARQ feedback.

In an aspect, a DCI can comprise a COT sharing bit in the second message to indicate an acquired COT channel for COT sharing between the gNB and one or more user equipments (UEs). The fourth message can be generated to share the COT with the HARQ feedback alone in an example.

In another aspect, a COT sharing bit can be configured in an uplink control information (UCI) or generating the COT sharing bit in a DCI to indicate that COT sharing is enabled for the random access procedure. In response to the COT sharing being enabled, an extra information (e.g., one or more reserve bits, padding information, or the like) can be enabled to configure a gap between at least one of: the second message and the third message, or the fourth message and the HARQ feedback. A gap can comprise less than or equal to sixteen microseconds, for example.

In response to the COT sharing being enabled, the second message as a RAR message can be configured with a PDSCH or a PDCCH to indicate a CAT1, CAT2, or CAT 4 listen-before-talk (LBT) that precedes the third message, or in response to the COT sharing being enabled, a duration from an end of the second message to a beginning of the third message can be configured to comprise at least 100 microseconds to enable a paused COT.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example may include a method of COT sharing between a gNB and a UE in the PRACH procedure which allows for gNB initiated COT to share COT with UE.

A second exampled may include the method as described in the first example or some other example herein, wherein above where the Msg3 is shared in the same COT as Msg2 by having the gap be a duration equal to either 16 us or 25 us.

A third example may include the method as described in the first example or some other example herein, where a COT sharing bit exists in the DCI.

A fourth example may include the method as described in the first example or some other example herein, where an LBT indication, for either CAT1 LBT, CAT2 LBT, or CAT 4 LBTS, set of bits exists in the DCI.

A fifth example may include a method as described in the first example or some other example herein, wherein above where the HARQ_ACK is shared in the same COT as Msg4 by having the gap be a duration equal to either 16 us or 25 us.

A sixth example may include the method as described in the first example or some other example herein, where 2 switching points occur. Msg2 acquires the COT and shares it msg3 and Msg4.

A seventh example may include the method as described in the first example or some other example herein, where 3 switching points occur. Msg2 acquires the COT and shares it Msg3, Msg4, and HARQ_ACK.

An eighth example may include the method in which a UE shares the COT with gNB and allows for Msg4 to be transmitted in the same COT as Msg3.

A ninth example may include the method as described in the eighth example or some other example herein, where a COT sharing bit exists in the UCI.

A tenth example may include the method as described in the eighth example or some other example herein, where a set of LBT indication bits exist in the UCI.

An eleventh example includes a method comprising: receiving, from a user equipment (UE), a first message that includes a preamble; generating a second message that indicates reception of the preamble and a time-adjustment command; and encoding the second message for transmission to the UE.

A twelfth example includes the method of the eleventh example and/or some other examples herein, wherein the second message is to be transmitted via physical downlink control channel (PDCCH) or physical downlink shared channel (PDSCH) signaling.

A thirteenth example includes the method of the eleventh example and/or some other examples herein, wherein the method further includes receiving, from the UE, a third message that includes a device identity, and wherein second message further includes a scheduling grant indicating a resource associated with the third message.

A fourteenth example includes the method of the thirteenth example and/or some other examples herein, wherein the second message and the third message share channel occupancy time (COT).

A fifteenth example includes the method of the eleventh example and/or some other examples herein, wherein the first message is a physical random access channel (PRACH) message.

A sixteenth example includes the method of the eleventh example and/or some other examples herein, wherein the second message is a random-access response (RAR) message.

A seventeenth example includes the method of the eleventh example and/or some other examples herein, wherein the method further includes: generating a fourth message that includes contention resolution information; and encoding the fourth message for transmission to the UE.

An eighteenth example includes the method of the seventeenth example and/or some other examples herein, wherein the fourth message shares channel occupancy time (COT) with a hybrid automatic repeat request acknowledgment (HARQ-ACK).

A nineteenth example includes the method of the eleventh example and/or some other examples herein, wherein the second message includes downlink control information (DCI) that comprises a COT-sharing bit.

A twentieth example includes the method of any of eleventh thru nineteenth examples and/or some other examples herein, wherein the method is performed by a next-generation NodeB (gNB).

A twenty-first example includes a method comprising: generating a first message that includes a preamble; encoding the first message for transmission to a next-generation NodeB (gNB); and receiving a second message from the gNB that indicates reception of the preamble and a time-adjustment command.

A twenty-second example includes the method of the twenty-first example and/or some other examples herein, wherein the second message is transmitted via physical downlink control channel (PDCCH) or physical downlink shared channel (PDSCH) signaling.

A twenty-third example includes the method of the eleventh example and/or some other examples herein, wherein the method further includes: generating a third message that includes a device identity; and encoding the third message for transmission to the gNB, wherein second message further includes a scheduling grant indicating a resource associated with the third message.

A twenty-fourth example includes the method of the twenty-third example and/or some other examples herein, wherein the second message and the third message share channel occupancy time (COT).

A twenty-fifth example includes the method of the twenty-first example and/or some other examples herein, wherein the first message is a physical random access channel (PRACH) message.

A twenty-sixth example includes the method of the twenty-first example and/or some other examples herein, wherein the second message is a random-access response (RAR) message.

A twenty-seventh example includes the method of the eleventh example and/or some other examples herein, wherein the method further includes: receiving, from the gNB, a fourth message that includes contention resolution information.

A twenty-eighth example includes the method of example 27 and/or some other examples herein, wherein the fourth message shares channel occupancy time (COT) with a hybrid automatic repeat request acknowledgment (HARQ-ACK).

A twenty-ninth example includes the method of the twenty-first example and/or some other examples herein, wherein the second message includes downlink control information (DCI) that comprises a COT-sharing bit.

A thirtieth example includes the method of any of examples 21-29 and/or some other examples herein, wherein the method is performed by a user equipment (UE).

A thirty-first example can be an apparatus employed in a user equipment (UE), comprising: processing circuitry that configures a random access procedure by sharing a channel occupancy time (COT), the processing circuitry configured to: generate a first message comprising a preamble of a random access channel (RACH); receive a second message indicating a reception of the preamble and comprising a time-adjustment command and a scheduling grant via a physical downlink channel; generate a third message based on a resource indicated by the scheduling grant of the second message; receive a fourth message comprising contention resolution information; and generate a hybrid automatic repeat request (HARQ) feedback based on the fourth message.

A thirty-second example can include the thirty-first example, wherein the COT comprises a next generation NodeB (gNB)-initiated COT or a UE-initiated COT, wherein the fourth message shares the COT with the HARQ feedback.

A thirty-third example can include any one or more of the thirty-first through thirty-second examples, where the processing circuitry is further configured to process a COT sharing indication from a downlink control information (DCI).

A thirty-fourth example can include any one or more of the thirty-first through thirty-third examples, where the processing circuitry is further configured to generate the third message in a COT comprising a same COT as the second message.

A thirty-fifth example can include any one or more of the thirty-first through thirty-fourth examples, wherein the processing circuitry is further configured to configure the third message to share the COT with the second message based on a gap therebetween that is sixteen microseconds or twenty-five microseconds.

A thirty-sixth example can include any one or more of the thirty-first through thirty-fifth examples, wherein the processing circuitry is further configured to configure the third message to share the COT with the fourth message to enable the third message to be transmitted on the COT of the fourth message.

A thirty-seventh example can include any one or more of the thirty-first through thirty-sixth examples, wherein the processing circuitry is further configured to generate a COT sharing indication in an uplink control information (UCI), or receive the indication of COT sharing via a radio resource control (RRC) layer signaling.

A thirty-eighth example can include any one or more of the thirty-first through thirty-seventh examples, wherein the processing circuitry is further configured to generate a listen-before-talk (LBT) indication in the UCI to indicate which LBT to perform.

A thirty-ninth example can be a tangible computer readable storage device storing executable instructions that, in response to execution, cause one or more processors of a network device comprising an access point or a next generation NodeB (gNB) to perform operations, the operations comprising: configuring a random access procedure by sharing a channel occupancy time (COT) comprising: receiving a first message comprising a preamble of a random access channel (RACH) configures a random access procedure by sharing a channel occupancy time (COT); generating a second message that indicates a reception of the preamble and comprising a time-adjustment command and a scheduling grant via a physical downlink channel for configuring a third message; receiving the third message based on a resource indicated by the scheduling grant of the second message; generating a fourth message to transfer a user equipment to a connected state; and receiving a hybrid automatic repeat request (HARQ) feedback based on the fourth message.

A fortieth example can include the ninth example, wherein the first message comprises a physical random access channel (PRACH) message, the second message comprises random access response (RAR) message, the third message comprises a device identity, and the fourth message comprises contention resolution information.

A forty-first example can include the fortieth example, the operations further comprising: configuring a scheduling grant in the second message that enables configuring of the third message in a same COT of at least one of: the second message, the third message, the fourth message or the HARQ feedback.

A forty-second example can include any one or more of the fortieth through forty-first examples, the operations further comprising: generating a downlink control information (DCI) comprising a COT sharing bit in the second message to indicate an acquired COT channel for COT sharing between the gNB and one or more user equipments (UEs).

A forty-third example can include any one or more of the fortieth through forty-second examples, the operations further comprising: generating the fourth message to share the COT with the HARQ feedback.

A forty-fourth example can include any one or more of the fortieth through forty-fourth examples, the operations further comprising: receiving a COT sharing bit in an uplink control information (UCI) or generating the COT sharing bit in a DCI to indicate that COT sharing is enabled for the random access procedure.

A forty-fifth example can include any one or more of the fortieth example through forty-fifth examples, the operations further comprising: in response to the COT sharing being enabled, generating an extra information to configure a gap between at least one of: the second message and the third message, or the fourth message and the HARQ feedback, wherein the gap comprises less than or equal to sixteen microseconds.

A forty-sixth example can include any one or more of the fortieth example through forty-fifth examples, the operations further comprising: in response to the COT sharing being enabled, configuring the second message as a RAR message with a physical downlink shared channel (PDSCH) or a physical downlink control channel (PDCCH) to indicate a CAT1, CAT2, or CAT 4 listen-before-talk (LBT) precedes the third message, or in response to the COT sharing being enabled, configuring a duration from an end of the second message to a beginning of the third message to comprise at least 100 microseconds to enable a paused COT.

A forty-seventh example can be a tangible computer readable storage device storing executable instructions that, in response to execution, cause one or more processors of a user equipment (UE) to perform operations, the operations comprising: generating a first message comprising a preamble of a random access channel (RACH); receiving a second message indicating a reception of the preamble and comprising a scheduling grant via a physical downlink channel; generating a third message based on a resource indicated by the scheduling grant of the second message; receiving a fourth message comprising contention resolution information; and generating a hybrid automatic repeat request (HARQ) feedback based on the fourth message; wherein at least two of: the first message, the second message, the third message, the fourth message, or the HARQ feedback share a channel occupancy time (COT) in a random access procedure.

A forty-eighth example can include the forty-seventh example, wherein the COT comprises a next generation NodeB (gNB)-initiated COT or a UE-initiated COT, and in response to the COT comprising a gNB-initiated COT, the operations further comprise generating an uplink (UL) transmission within the COT comprising a CAT1 listen-before-talk (LBT) or a CAT2 LBT based on a duration of a gap between a downlink (DL) transmission and the UL transmission.

A forty-ninth example can include any one or more of the forty-seventh through forty-eighth examples, the operations further comprising: sharing the COT with the third message and the second message, or with the fourth message and the HARQ feedback that corresponds to the fourth message.

A fiftieth example can include any one or more of the forty-seventh through forty-ninth examples, the operations further comprising: generating a COT sharing bit in an uplink control information (UCI) or processing the COT sharing bit in a DCI to indicate that COT sharing is enabled for the random access procedure in an unlicensed spectrum; and in response to the COT sharing being enabled, receiving an extra information that configures a gap between at least one of: the second message and the third message, or the fourth message and the HARQ feedback.

A fifty-first example can include any one or more of the forty-seventh through fiftieth examples, the operations further comprising: in response to COT sharing being enabled, configuring the third message according to a CAT1, CAT2, or CAT 4 listen-before-talk (LBT) preceding the third message based on an LBT indication in a random access response (RAR) message as the second message, and configuring a duration from an end of the second message to a beginning of the third message to enable a paused COT.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus employed in a user equipment (UE), comprising processing circuitry configured to:
   generate and cause transmission of a first message comprising a preamble of a random access channel (RACH);
   receive, from a base station, a second message indicating a reception of the preamble and comprising a time-adjustment command and a scheduling grant via a physical downlink channel;
   generate and cause transmission of a third message based on a resource indicated by the scheduling grant of the second message;

receive, from the base station, a fourth message comprising contention resolution information; and generate a hybrid automatic repeat request (HARQ) feedback based on the fourth message, wherein the third message includes a listen-before-talk (LBT) indication that indicates which LBT type the base station is to perform, and wherein the LBT indication comprises one bit of an uplink control information (UCI).

2. The apparatus of claim 1, wherein the LBT indication comprises two bits of an uplink control information (UCI).

3. The apparatus of claim 1, wherein the second message comprises a random access response (RAR) message.

4. The apparatus of claim 1, wherein a channel access priority class (CAPC) is indicated by the third message. .

5. The apparatus of claim 1, wherein the processing circuitry is further configured to configure the third message to share a channel occupancy time (COT) with the second message based on a gap therebetween that is sixteen microseconds or twenty-five microseconds.

6. A method for a base station, comprising:

receiving a first message from a user equipment (UE), the first message comprising a preamble of a random access channel (RACH) configured to perform a random access procedure;

generating and transmitting a second message that indicates a reception of the preamble and comprising a time-adjustment command and a scheduling grant via a physical downlink channel for configuring a third message;

receiving the third message from the UE based on a resource indicated by the scheduling grant of the second message;

generating and transmitting a fourth message to transfer the UE to a connected state; and receiving a HARQ feedback from the UE based on the fourth message, wherein the third message includes a listen-before-talk (LBT) indication that indicates which LBT type the base station is to perform, wherein the third message comprises a UCI that includes two bits that comprise the LBT indication.

7. The method of claim 6, wherein the second message comprises random access response (RAR).

8. A method for a user equipment (UE), comprising:

generating a first message comprising a preamble of a random access channel (RACH);

receiving a second message indicating a reception of the preamble and comprising a scheduling grant via a physical downlink channel;

generating a third message based on a resource indicated by the scheduling grant of the second message;

receiving a fourth message comprising contention resolution information; and generating a hybrid automatic repeat request (HARQ) feedback based on the fourth message;

wherein the third message includes a listen-before-talk (LBT) indication that indicates which LBT type a base station is to perform, and wherein at least two of: the first message, the second message, the third message, the fourth message, or the HARQ feedback share a channel occupancy time (COT) in a random access procedure, wherein the HARQ feedback is transmitted within 16 microseconds of the fourth message.

9. The method of claim 8, wherein the LBT indication comprises two bits of an uplink control information (UCI).

10. The method of claim 8, wherein the LBT indication comprises one bit of an uplink control information (UCI).

11. The method of claim 8, wherein the second message comprises a random access response (RAR) message.

12. The method of claim 8, wherein a channel access priority class (CAPC) is indicated by the third message.

13. The apparatus of claim 1, wherein the one bit in the UCI that indicates LBT is a channel occupancy time (COT) sharing bit.

14. The method of claim 6, wherein a first bit of the two bits that comprise the LBT indication is a channel occupancy time (COT) sharing bit.

15. The method of claim 8, wherein the third message includes a COT sharing bit.

* * * * *